(12) United States Patent
Krych et al.

(10) Patent No.: US 11,273,772 B2
(45) Date of Patent: Mar. 15, 2022

(54) MOUNTING SYSTEM FOR MOUNTING A NUMBER PLATE CARRIER ON A VEHICLE COMPONENT OF A SINGLE-TRACK MOTOR VEHICLE

(71) Applicant: Bayerische Motoren Werke Aktiengesellschaft, Munich (DE)

(72) Inventors: Tim Krych, Munich (DE); Martin Pazulla, Wolfratshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/264,800

(22) PCT Filed: Jun. 11, 2019

(86) PCT No.: PCT/EP2019/065179
§ 371 (c)(1),
(2) Date: Jan. 30, 2021

(87) PCT Pub. No.: WO2020/025205
PCT Pub. Date: Feb. 6, 2020

(65) Prior Publication Data
US 2021/0291756 A1    Sep. 23, 2021

(30) Foreign Application Priority Data

Jul. 31, 2018    (DE) ............... 10 2018 212 718.2

(51) Int. Cl.
*B60R 13/10*    (2006.01)
*B62J 50/26*    (2020.01)
*B62K 11/00*    (2006.01)

(52) U.S. Cl.
CPC ............. *B60R 13/105* (2013.01); *B62J 50/26* (2020.02); *B62K 11/00* (2013.01)

(58) Field of Classification Search
CPC .......... B62J 13/105; B62J 50/26; B62M 7/00; B62K 11/00; B62K 11/02
See application file for complete search history.

(56) References Cited

U.S. PATENT DOCUMENTS

| | | | |
|---|---|---|---|
| 8,459,393 B2 * | 6/2013 | Yamamoto | ............... B62J 15/00 |
| | | | 180/219 |
| 2004/0124024 A1 * | 7/2004 | Kurayoshi | ............. B62K 19/30 |
| | | | 180/219 |

(Continued)

FOREIGN PATENT DOCUMENTS

| | | |
|---|---|---|
| DE | 42 32 192 A1 | 9/1992 |
| DE | 297 04 618 U1 | 5/1997 |

(Continued)

OTHER PUBLICATIONS

International Search Report (PCT/ISA/210) issued in PCT Application No. PCT/EP2019/065179 dated Jul. 19, 2019 with English translation (five (5) pages).

(Continued)

*Primary Examiner* — Cassandra Davis
(74) *Attorney, Agent, or Firm* — Crowell & Moring LLP

(57) ABSTRACT

A mounting system for mounting a number plate carrier on a vehicle component of a single-track motor vehicle is provided. The vehicle component consists of a vehicle frame, a rear carrier component which is fixed to the vehicle frame. The number plate carrier has at least one securing hook, and the rear carrier component has at least one corresponding through-engagement opening. The number plate carrier can be hooked by the at least one securing hook into the respective through-engagement opening, aligned on the vehicle component in a predetermined position and pre-fixed securely in position. The number plate carrier can be fastened to the vehicle frame by a fastener spaced apart (Continued)

from the at least one securing hook along a longitudinal axis of the single-track motor vehicle.

12 Claims, 2 Drawing Sheets

(56) References Cited

U.S. PATENT DOCUMENTS

| | | |
|---|---|---|
| 2006/0068206 A1 | 3/2006 | Hala et al. |
| 2007/0046016 A1* | 3/2007 | Fujimoto ............... B62J 15/00 280/847 |
| 2009/0108557 A1 | 4/2009 | Kobayashi et al. |

FOREIGN PATENT DOCUMENTS

| | | |
|---|---|---|
| EP | 1 640 134 A1 | 3/2006 |
| WO | WO 2015/098879 A1 | 7/2015 |

OTHER PUBLICATIONS

German-language Written Opinion (PCT/ISA/237) issued in PCT Application No. PCT/EP2019/065179 dated Jul. 19, 2019 (five (5) pages).
German-language Search Report issued in German Application No. 10 2018 212 718.2 dated May 28, 2019 (11 pages).

* cited by examiner

MOUNTING SYSTEM FOR MOUNTING A NUMBER PLATE CARRIER ON A VEHICLE COMPONENT OF A SINGLE-TRACK MOTOR VEHICLE

BACKGROUND AND SUMMARY OF THE INVENTION

The invention relates to a mounting system for mounting a license plate holder on a single-track motor vehicle.

A multiplicity of mounting systems for mounting a license plate holder on single-track motor vehicles such as, for example, motorcycles, are already known in the prior art. The license plate holders are in most instances mounted on the rear frame of the motor vehicle by way of at least three screws so as to establish a sufficiently rigid and stable connection. On account of the direct connection between the license plate holder and the rear frame, the license plate holder is to be fixed in such a manner in relation to the rear frame that no relative movement of the license plate holder in relation to the rear frame arises when the rear frame is torsioned about a longitudinal axis of the single-track motor vehicle, for example. If the connection lacks stability, a swaying movement of the license plate holder in relation to the rear frame can arise when negotiating bends or during evasive maneuvers, for example, on account of which aerodynamic properties and the handling of the motor vehicle are also negatively affected.

In addition, a low weight is advantageous with a view to reducing the fuel consumption in particular in the case of modern motor vehicles. In contrast however, a sufficiently stable connection of the license plate holder exclusively by way of a screw fitting has a comparatively great weight. Moreover, the assembly of such a license plate holder that is fixed to the motor vehicle only by way of a screw fitting is complex and expensive, because the license plate holder has to be aligned on the motor vehicle, or on the rear frame of the motor vehicle, respectively, by a device or by hand, and has to be fixed in the state aligned by the device.

The invention is therefore based on the object of providing a light and cost-effective mounting system for mounting a license plate holder on a vehicle component of a single-track motor vehicle, on account of which a stable connection can be established between the license plate holder and the vehicle component and the license plate holder can be assembled in a rapid and simple manner on the vehicle component.

This object is achieved by a mounting system for mounting a license plate holder on a vehicle component of a single-track motor vehicle. The vehicle component comprises a vehicle frame and a rear support component which is fixed to the vehicle frame. The license plate holder can be configured in one part or a plurality of parts, and has at least one mounting hook which is preferably configured so as to be integral to the remaining part of the license plate holder, or at least forms one part with the latter. The rear support component has in each case one engagement opening for each mounting hook, the engagement opening corresponding to the mounting hook and the mounting hook being able to be plug-fitted through the engagement opening. The license plate holder by way of the at least one mounting hook is able to be plugged into the respective engagement opening and is able to be aligned and provisionally fixed so as to be fixed in a predetermined position on the vehicle component. The mounting hook, on account of having been plugged into or through the engagement opening, respectively, preferably engages behind a portion of the rear support component. The mounting system furthermore has a screw fitting. The license plate holder is able to be screwed to the vehicle frame by way of a screw fitting which is spaced apart from the at least one mounting hook along a vehicle longitudinal axis of the single-track motor vehicle.

The mounting system herein preferably comprises the license plate holder and the vehicle component with the rear support component and the vehicle frame, as well as the screw fitting. The screw fitting is preferably formed by through bores on the license plate holder, a thread which is in each case configured in the vehicle frame, as well as by the screws that are able to be plug-fitted through the through bores and screwed to the respective thread.

The license plate holder, by way of the mounting hooks that are plugged into the engagement openings and displaced to a predetermined position (preassembly position), are aligned and provisionally fixed along the vehicle longitudinal axis as well as along a vehicle transverse axis of the single-track motor vehicle that is orthogonal to the vehicle longitudinal axis. The preassembly can be established without the screw fitting, wherein the license plate holder can be finally assembled on the vehicle component by the screw fitting.

When assembling, the mounting hooks can initially be plugged into the corresponding engagement openings, wherein the license plate holder by way of the plugged-in mounting hooks can subsequently be pushed into a preassembly position. The license plate holder in the aligned preassembly position thereof, in which the screw-fitting locations of the license plate holder are congruent with the screw-fitting locations of the vehicle component, is held in the preassembly position on the motor vehicle, or on the vehicle component, respectively, such that the license plate holder in the final assembly can be screwed to the vehicle component without the license plate holder having to be freshly aligned or held during the final assembly.

The mounting hooks hold the license plate holder on the vehicle component, wherein a mass of the license plate holder has to be held by way of the mounting hooks. In order to withstand the mass of the license plate holder and at the same time to configure the mounting hooks so as to be lightweight, one advantageous refinement of the invention provides that the mounting hook extends from an assembly face of the license plate holder, and a reinforcement rib which reinforces the mounting hook is configured on the mounting hook. The mounting hook has in particular a first portion and a second portion which runs so as to be substantially orthogonal to the first portion, wherein the reinforcement rib preferably extends across the first and the second portion.

One mounting hook preferably has in each case two reinforcement ribs which are mutually spaced apart in the vehicle transverse direction (or along the vehicle transverse axis, respectively), and are disposed in peripheral portions of the mounting hook that are spaced apart in the vehicle transverse direction.

One further advantageous variant of configuration of the mounting system moreover provides that the license plate holder has a center of mass and a support portion, and that the at least one mounting hook along the vehicle longitudinal axis is disposed between the center of mass and the support portion. The support portion is furthermore configured for supporting in relation to the vehicle component a weight that on account of the mass of the license plate holder acts on the vehicle component at the mounting hooks. In the absence of such a support portion, or on account of a disposal of the support portion in relation to the mounting hook and the center of mass deviating therefrom, the mounting hook would be released from the engagement opening by virtue of the mass of the license plate holder, or the license plate holder would rotate in a plugged-in state.

According to an additional refinement of the mounting system, the at least one mounting hook configures in each case one latching cam, and the vehicle component, or the rear support component, respectively, has a latching protrusion on the respective engagement opening. The mounting hook by way of the latching cam thereof is configured to engage behind the latching protrusion. Furthermore, the mounting hook by way of the latching protrusion thereof supports the license plate holder along the vehicle longitudinal axis and by way of the latching cam is able to be aligned along the vehicle longitudinal axis. The preassembly position in a variant of configuration with a latching cam is preferably determined by the latching cam and the latching protrusion, or by the mutual latching of the latching cam and the latching protrusion, respectively.

An alternative variant of configuration which however is likewise advantageous provides that the mounting hook bears tightly on the rear support component and is clamped to the latter on account of the tight bearing fit. The license plate holder herein is held on the rear support component on account of the mounting hook being clamped to the rear support component.

In a likewise advantageous variant of the mounting system the mounting hook configures a positioning protrusion which preferably extends along the vehicle longitudinal axis and along at least one portion of the mounting hook. The vehicle component, or the rear support component, respectively, on the engagement opening moreover has a positioning groove that corresponds to the positioning protrusion. The positioning protrusion is preferably able to be pushed into the positioning groove during the preassembly, or by a plug-fitting movement, respectively. The positioning protrusion pushed into the positioning groove supports the license plate holder on the vehicle component along a vehicle transverse axis of the single-track motor vehicle, wherein the license plate holder is moreover able to be aligned along the vehicle transverse axis by pushing the positioning protrusion into the positioning groove, and in the preassembly position is in particular aligned along the vehicle transverse axis.

In order for the positioning protrusion to be able to be more easily pushed into the positioning groove, the positioning groove on a side that faces the engagement opening can have an introduction ramp along which the positioning groove widens and thus forms a funnel-type guide for the positioning protrusion.

The positioning protrusion can moreover be configured integrally as a reinforcement rib.

In one refinement, the license plate holder has at least two mounting hooks which are mutually spaced apart along a vehicle transverse axis of the single-track motor vehicle.

In one further advantageous variant of configuration, the screw fitting is furthermore formed by at least two screws which are mutually spaced apart along a vehicle transverse axis of the single-track motor vehicle, and spaced apart from the mounting hooks along the vehicle longitudinal axis.

In order for the forces that are applied to the rear support component by the mounting hooks and, if present, by the support portion of the license plate holder to be able to be supported, the rear support component in one advantageous variant has a mounting portion. The engagement opening, or the engagement openings, respectively, are configured in the mounting portion, wherein the latter moreover has reinforcement ribs. The reinforcement ribs are configured for reinforcing the mounting portion in a torsion-resistant manner. On account thereof, the rear support component is lightweight, on the one hand, and configured so as to be sufficiently stable for the forces able to be transmitted by the license plate holder, on the other hand.

In order for a lightweight and at the same time stable configuration of the rear support component to be enabled, one advantageous refinement provides that the rear support component is formed from a first material which comprises polypropylene and glass fibers. The proportion of glass fibers in the first material is between 10% and 30%, and preferably 20%.

One further advantageous variant of the mounting system moreover provides that the license plate holder is formed from a second material. The second material likewise comprises polypropylene and glass fibers, wherein the proportion of glass fibers in the second material is between 30% and 50%, and preferably 40%.

A further aspect of the invention provides a single-track motor vehicle having a mounting system according to the invention.

The features disclosed above can be readily combined to the extent that this is technically possible and the features are not mutually exclusive.

Other advantageous refinements of the invention are characterized in the dependent claims, or will be illustrated in more detail hereunder in conjunction with the description of the preferred embodiment of the invention by means of the figures.

DETAILED DESCRIPTION

Figure 2:
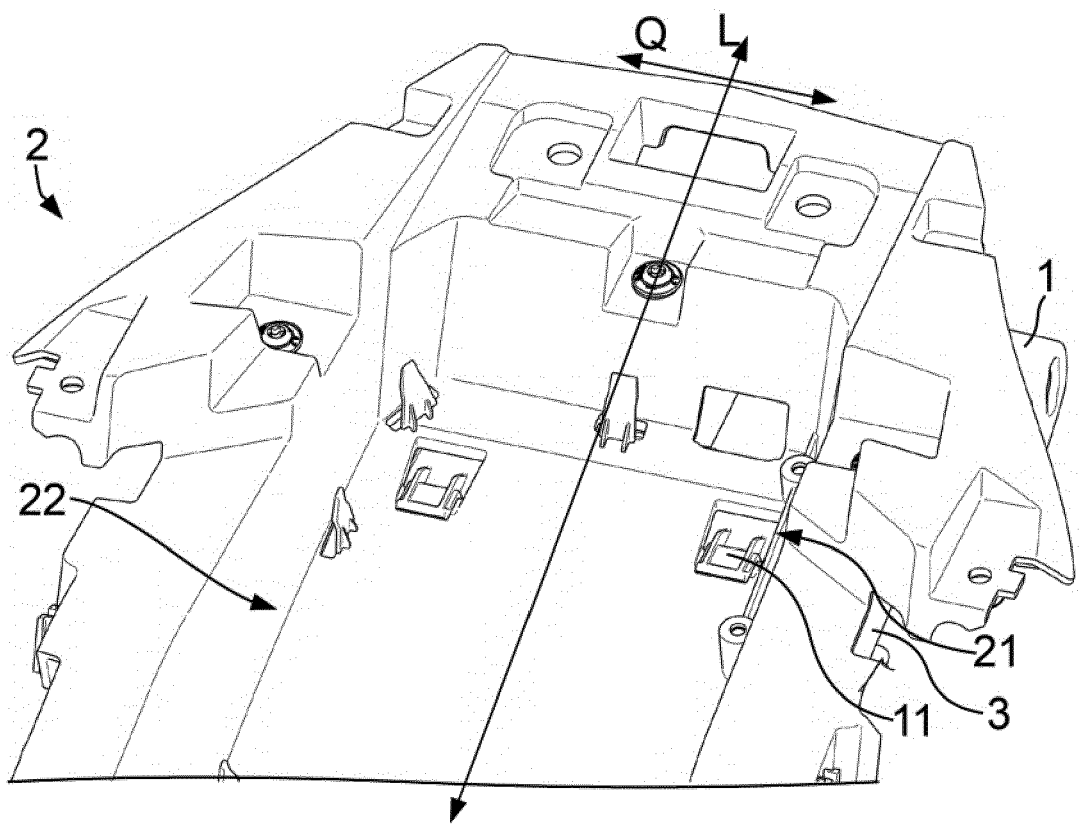
FIG. 2 shows a vehicle component having the license plate holder of FIG. 1 mounted thereon, in a view from above.
Figure 3:
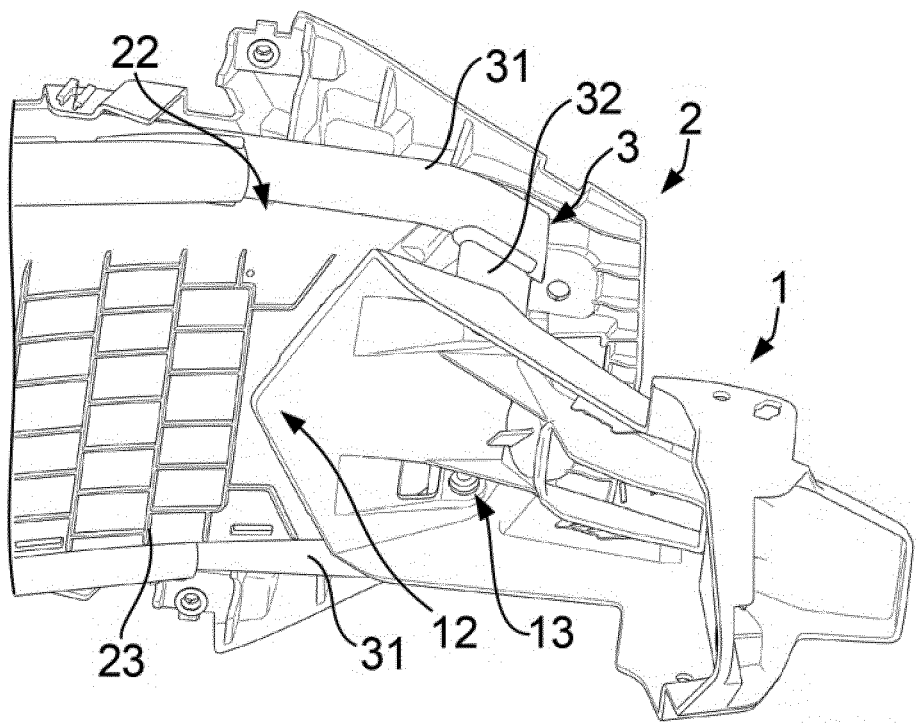
FIG. 3 shows the vehicle component of FIG. 2 having the license plate holder of FIG. 1 mounted thereon, in a view from below.
Figure 4:
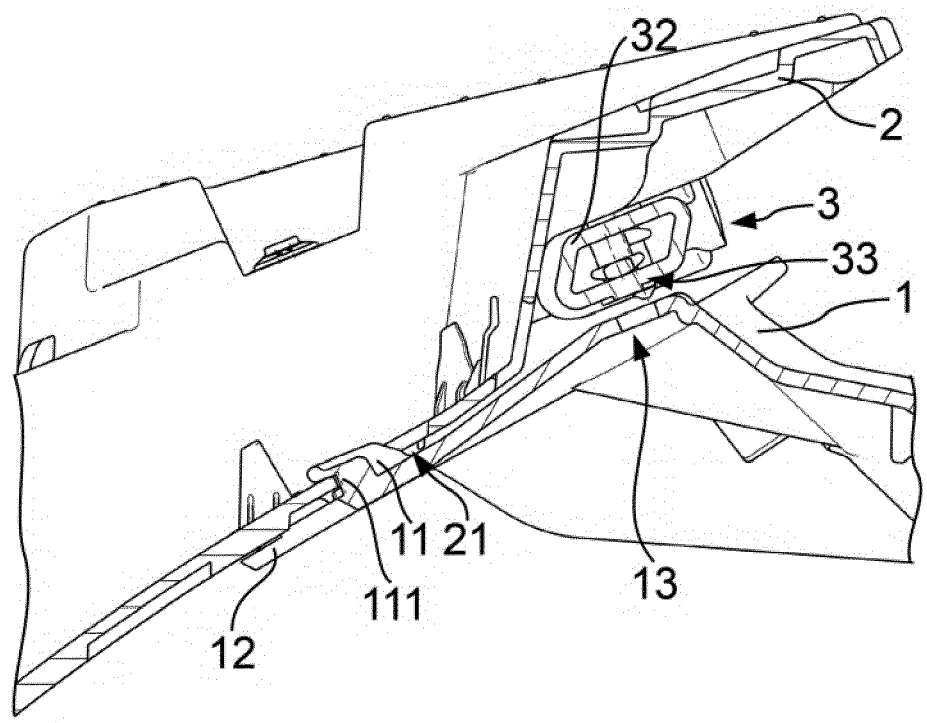
FIG. 4 shows the vehicle component of FIG. 2 illustrated in a sectional view parallel to the vehicle longitudinal axis, having a license plate holder of FIG. 1 mounted thereon, in a lateral view.

The figures are schematic in an exemplary manner. The same reference signs in the figures identify identical functional and/or structural features. Furthermore, the license plate holder 1 and the vehicle component with the vehicle frame 3 thereof and the rear support component 2 are in each case illustrated in a perspective manner in FIGS. 1 to 4, wherein FIGS. 2 to 4 show in each case only a fragment, or a portion, respectively, of the vehicle component.

Figure 1:
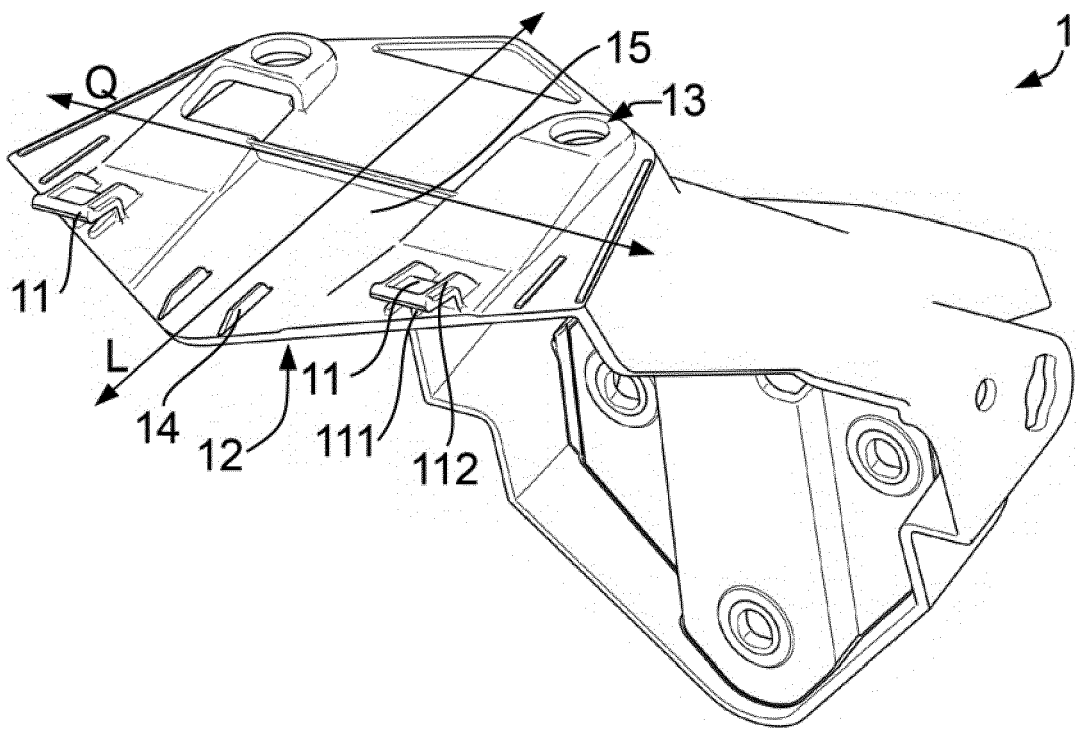
FIG. 1 shows a license plate holder in accordance with an embodiment of the present invention.

A license plate holder 1 which on a mounting side that in the installed state points toward the vehicle component has two mounting hooks 11 which are mutually spaced apart along a vehicle transverse axis Q and extend from an assembly face 15 on the mounting side of the license plate holder 1 is illustrated in FIG. 1. The assembly face 15, or the license plate holder 1, respectively, runs along a vehicle longitudinal axis L that is orthogonal to the vehicle transverse axis Q, so that the assembly face 15, or the license plate holder 1, respectively, configures a support portion 12. The latching hooks 11 along the vehicle longitudinal axis L lie between the support portion 12 and a center of mass of the license plate holder 1, on account of which the license plate holder 1 in a state plugged into the vehicle component is held on the vehicle component and is supported by the support portion 12.

In order to be provisionally positioned when plugging the license plate holder 1 into the engagement openings 21 of the rear support component 2 provided therefor by way of the mounting hooks 11 of the license plate holder 1, the license plate holder 1 on the assembly face 15 thereof moreover configures introduction aids 14 which are preferably configured as two protrusions that extend from the assembly face 15 and are mutually spaced apart along the vehicle transverse axis Q. The introduction aids 14, when being plugged in, can be brought to bear on a guide face that is preferably configured on the rear support component 2 such that the license plate holder 1 when being plugged in is guided along the guide face by the introduction aids 14, and the mounting hooks 11 in the predetermined manner are aligned to the engagement openings 21.

In order for the license plate holder 1 to be aligned along the vehicle transverse axis Q for the screw fitting, and for the license plate holder 1 in the region of the mounting hooks 11 at the same time to be supported against being displaced in the vehicle transverse direction Q, the mounting hooks 11 configure in each case one positioning protrusion 111.

The license plate holder 1 moreover has through bores 13 for fixing to the vehicle component, one screw being in each case able to be plug-fitted through the through bores 13 and screwed to the vehicle frame 3 such that the screws plug-fitted through the through bores 13 and screwed to the vehicle frame 3 form the screw fitting. In order for the license plate holder 1 to be fixed on the vehicle frame 3 in a torsion-resistant manner, the through bores 13 and the locations for screw-fitting to the vehicle frame 3 are in each case spaced apart along the vehicle transverse axis Q.

In order for the mounting hooks 11 to be reinforced, the latter in the example depicted are configured having two reinforcement ribs 112 that are spaced apart along the vehicle transverse axis Q and extend along the longitudinal axis L, on account of which the load-bearing capability of the mounting hooks 11, while being lightweight, can be increased.

FIG. 2 shows the vehicle component having the plugged-in license plate holder 1 in fragments and from obliquely above. The rear support component 2 almost completely obscures the vehicle frame 3, is screwed to the latter, and completely spans an intermediate space formed by the vehicle frame 3. A mounting portion 22 of the rear support component 2 in which the engagement openings 21 that correspond to the mounting hooks 11 are configured is disposed in the obscured or spanned, respectively, intermediate space. The engagement openings 21, when seen in a plan view from above, preferably have a trapezoidal contour, wherein the shorter side of the trapezoid is adjacent to a plug-fit region on which the respective mounting hook 11 bears in the preassembly position and the final assembly position. On account thereof, a larger region of the engagement opening 21 is initially available when the mounting hooks 11 are plugged in, the region decreasing in size during the plug-fitting movement, on account of which the respective mounting hook 11 is guided to the plug-fitting region.

The mounting system preferably provides three guiding devices on account of which the license plate holder 1 can be plug-fitted to the vehicle component in a rapid and highly precise manner. The introduction aids 14 and the corresponding guide face, by way of which the license plate holder 1 and in particular the mounting hooks 11 are guided to the engagement openings 21, serve as first guiding device. Once the mounting hooks 11 have been guided to the respective engagement openings 21, the trapezoidal shape of the engagement openings 21 serves in enabling rapid plug-fitting, and in guiding the mounting hooks 11 to the plug-fit region in the further plug-fitting movement along the vehicle longitudinal axis L and in simultaneously centering the mounting hooks 11 such that the positioning protrusion 111 of the respective mounting hook 11 is aligned with the positioning groove of the respective engagement opening 21. The positioning protrusions 111 form the third guiding device by way of which the mounting hooks 11 are guided to the rear support component 2 in the last part of the plug-fitting movement in the respective positioning groove. On account thereof, increasingly more guiding devices contribute toward guiding the license plate holder 1 along the plug-fitting movement. Moreover, the guiding devices in the respective region thereof can support the license plate holder 1 in relation to transverse forces that act along the vehicle transverse axis Q.

Additionally or alternatively, the introduction aids 14 can also serve in guiding a tilting movement. For example, the license plate holder 1 by way of the introduction aids 14 thereof can be placed obliquely on the guide face of the rear support component 2, and the assembly face 15 can be brought to bear in a planar manner on the rear support component 2 by a tilting movement. Either a plug-fitting movement as described above that is guided by the introduction aids 14 can be subsequently carried out, or the mounting hooks 11 in the tilting movement are alternatively plug-fitted directly through the engagement openings 21, on account of which the first part of the plug-fitting movement in which the mounting hooks 11 are guided along the longitudinal axis L to the engagement openings 21 is dispensed with.

The vehicle component with the rear support component 2 thereof and the vehicle frame 3 as well as the license plate holder 1 that is plug-fitted to the vehicle component but not yet screw-fitted thereto, is illustrated in a view from obliquely below in FIG. 3. Reinforcement ribs 23 are configured in the mounting portion 22 in order for the mounting portion 22 to be reinforced and for the attachment of the license plate holder 1 to the rear support component 2 to be improved. The reinforcement ribs 23 are preferably molded in a honeycomb manner, on account of which a high degree of rigidity or strength, respectively, and simultaneously a low weight of the mounting portion 22 can be achieved.

The vehicle frame 3 in the depicted fragment of the vehicle component is determined substantially by two mutually parallel tubes 31 which are connected to one another by a crossmember 32. In the exemplary embodiment depicted, the license plate holder 1 is screw-fitted to the crossmember 32, wherein the screw fitting can alternatively be configured on the tubes 31.

The rear support component 2, the crossmember 32, and the license plate holder 1 are shown in a sectional illustration in FIG. 4, the section running parallel to the vehicle longitudinal axis L through one of the mounting hooks 11 and in particular also through the positioning protrusion 111.

As can be seen in the sectional view, the positioning protrusion 111 extends from the assembly face 15 to a portion of the mounting hook 11 which is parallel to the mounting portion 22 of the rear support component 2, or is substantially parallel thereto, respectively. On account thereof, the positioning protrusion 111 is configured as a reinforcement rib which reinforces the respective mounting hook 11 thereof and increases the load-bearing capability of the mounting hook 11. The preassembly position or the final assembly position, respectively, of the license plate holder 1 on the rear support component 2 is moreover determined by a contact face of the positioning protrusion 111 or of the mounting hook 11, the contact face being orthogonal to the vehicle longitudinal axis L, the contact face in the preassembly or final assembly position bearing on a counter bearing face formed on the engagement opening 21. When the license plate holder 1 is situated in the preassembly position thereof, the through bores 13 are in each case disposed exactly at a position for screw-fitting to the crossmember 32. Threads for the screw fitting are fixed or configured in the crossmember 32 such that a screw can in each case be plug-fitted through one of the through bores 13 and can in each case be screw-fitted to one of the threads on the crossmember 32.

The invention in terms of the embodiment thereof is not limited to the preferred exemplary embodiments stated above. Rather, a number of variants which make use of the illustrated solution even in embodiments of a fundamentally different nature are conceivable.

What is claimed is:

1. A holder mounting system for a single-track motor vehicle, comprising:
   a license plate holder;
   a vehicle frame; and
   a rear support component fixed to the vehicle frame, wherein
   the license plate holder has at least one mounting hook, each of the at least one mounting hook being configured to engage a corresponding engagement opening of the rear support component,
   the license plate holder is configured such that when the at least one mounting hook is engaged with the corresponding engagement opening, the license plate holder is able to be aligned and provisionally fixed in a predetermined position on the rear support component, and
   the license plate holder is configured to be fixed to the vehicle frame by at least one fastener engaging a fastener fitting that is spaced apart from the at least one mounting hook along a longitudinal axis of the single-track motor vehicle.

2. The mounting system according to claim 1, wherein
   the license plate holder has a center of mass and a support portion,
   the at least one mounting hook is disposed between the center of mass and the support portion, and
   the support portion is configured to support a force generated by a mass of the license plate holder that acts on the at least one mounting hook.

3. The mounting system according to claim 1, wherein
   each mounting hook of the at least one mounting hook includes a latching cam,
   the rear support component has a latching protrusion at each corresponding engagement opening, and
   the at least one mounting hook aligns and supports the license plate holder along the vehicle longitudinal axis with each latching cam configured to engage behind the corresponding latching protrusion.

4. The mounting system according to claim 1, wherein
   each mounting hook of the at least one mounting hook includes a positioning protrusion,
   each corresponding engagement opening of the rear support component has a positioning groove configured such that the license plate holder is aligned and supported along a vehicle transverse axis of the single-track motor vehicle on the rear support component as the positioning protrusion is pushed into engagement with the corresponding positioning groove.

5. The mounting system according to claim 1, wherein
   the at least one mounting hook includes at least two mounting hooks, and
   the at least two mounting hooks are mutually spaced apart along a vehicle transverse axis of the single-track motor vehicle.

6. The mounting system according to claim 5, wherein
   the fastener fitting is a screw fitting,
   the screw fitting includes at least two screws mutually spaced apart along the vehicle transverse axis, and
   the screw fitting is spaced apart from the at least two mounting hooks along the vehicle longitudinal axis.

7. The mounting system according to claim 6, wherein
   the rear support component is formed from a first material which includes polypropylene and glass fibers, and
   a proportion of glass fibers in the first material is between 10% and 30%.

8. The mounting system according to claim 7, wherein
   the license plate holder is formed from a second material which includes polypropylene and glass fibers, and
   a proportion of glass fibers in the second material is between 30% and 50%.

9. The mounting system according to claim 1, wherein
   the rear support component has a mounting portion in which the corresponding engagement openings are arranged, and
   the mounting portion includes reinforcement ribs configured to reinforce the mounting portion in a torsion-resistant manner.

10. The mounting system according to claim 9, wherein
    the rear support component is formed from a first material which includes polypropylene and glass fibers, and
    a proportion of glass fibers in the first material is between 10% and 30%.

11. The mounting system according to claim 10, wherein
    the license plate holder is formed from a second material which includes polypropylene and glass fibers, and
    a proportion of glass fibers in the second material is between 30% and 50%.

12. A single-track motor vehicle having a mounting system according to claim 1.

* * * * *